US005134427A

United States Patent [19]

Akiyama et al.

[11] Patent Number: 5,134,427

[45] Date of Patent: Jul. 28, 1992

[54] IMAGE FORMING APPARATUS

[75] Inventors: Satoshi Akiyama; Kenjiro Hori, both of Yokohama; Takashi Nakahara, Kawasaki; Yoshimi Kuramochi, Yokohama; Toshio Yoshimoto, Tokyo; Shunichi Masuda, Kawasaki, all of Japan

[73] Assignee: Canon Kabushiki Kaisha, Tokyo, Japan

[21] Appl. No.: 578,673

[22] Filed: Sep. 7, 1990

[30] Foreign Application Priority Data

Sep. 8, 1989 [JP] Japan ................................ 1-231362

[51] Int. Cl.[5] ..................... G01D 15/06; G03G 21/00

[52] U.S. Cl. ................................ 346/153.1; 355/316; 355/317

[58] Field of Search .............................. 355/316, 317; 346/153.1

[56] References Cited

U.S. PATENT DOCUMENTS

| | | | |
|---|---|---|---|
| 3,876,300 | 4/1975 | Washio et al. | 355/316 |
| 4,310,236 | 1/1982 | Connin | 355/317 |
| 4,417,806 | 11/1983 | Tani et al. | 355/317 |
| 4,804,998 | 2/1989 | Miyawaki | 355/317 |
| 4,918,489 | 4/1990 | Inage et al. | 355/316 X |
| 4,956,651 | 9/1990 | Emori | 355/316 X |
| 4,962,404 | 10/1990 | Wakikaido | 355/317 X |

*Primary Examiner*—George H. Miller, Jr.
*Attorney, Agent, or Firm*—Fitzpatrick, Cella, Harper & Scinto

[57] ABSTRACT

A recording apparatus comprises a recording unit for recording information onto a recording medium, a feeder for feeding the recording medium to the recording unit, a detector between the recording unit and the feeder for detecting the recording medium being fed, and a controller for inhibiting the recording operation of the recording unit when the detector detects the recording medium before the elapse of a predetermined period of time from the start of the feeding operation of the feeder.

15 Claims, 7 Drawing Sheets

IMAGE FORMING APPARATUSBACKGROUND OF THE INVENTION

1. Field of the Invention

The present invention relates to an image forming apparatus for forming an image onto a recording medium which is conveyed.

2. Related Background Art

Hitherto, such a kind of apparatus has widely been spread as an output apparatus of an OA apparatus.

In general, such a kind of apparatus mainly comprises: a feed processing section for feeding a recording medium into the apparatus; a paper feed processing section for feeding the recording medium which was fed from the feed processing section to an image forming processing section; a developing processing section for developing an electrostatic latent image formed in the image forming processing section; a transfer processing section for transferring the image developed by the developing processing section onto the recording medium; a fixing processing section for executing a fixing processing to the recording medium whose transfer processing was completed; and the like.

On the other hand, in many cases, the paper feed processing section and the image forming processing section execute some synchronization matching processing to synchronize the image writing timing. Hitherto, the start of the driving of a paper feed roller called a resist roller or the time to open a resist shutter is performed synchronously with the start of the writing of an image (synchronization in the sub scanning direction).

As mentioned above, in the conventional image forming apparatus, since the synchronization matching in the sub scanning direction is executed by the resist roller or the like, a paper feeding mechanism of the apparatus becomes complicated and the costs increase.

On the other hand, since the synchronization matching in the sub scanning direction by the resist roller or the like is performed by certainly once stopping the recording medium which was fed, there are problems such that the paper feeding interval of the recording medium cannot be reduced, it is difficult to improve a throughput, and the like.

SUMMARY OF THE INVENTION

It is an object of the present invention to provide an image forming apparatus which can execute the synchronization matching between the paper feed of a recording medium and the image formation without using resist means such as a resist roller or the like.

Another object of the invention is to provide an image forming apparatus which can solve various problems which occur in the case where the resist means such as a resist roller or the like is not used.

Still another object of the invention is to provide an image forming apparatus in which the apparatus can be miniaturized and a throughput can be improved.

The above and other objects and features of the present invention will become apparent from the following detailed description and the appended claims with reference to the accompanying drawings.

DETAILED DESCRIPTION OF PREFERRED EMBODIMENTS

Figure 1:
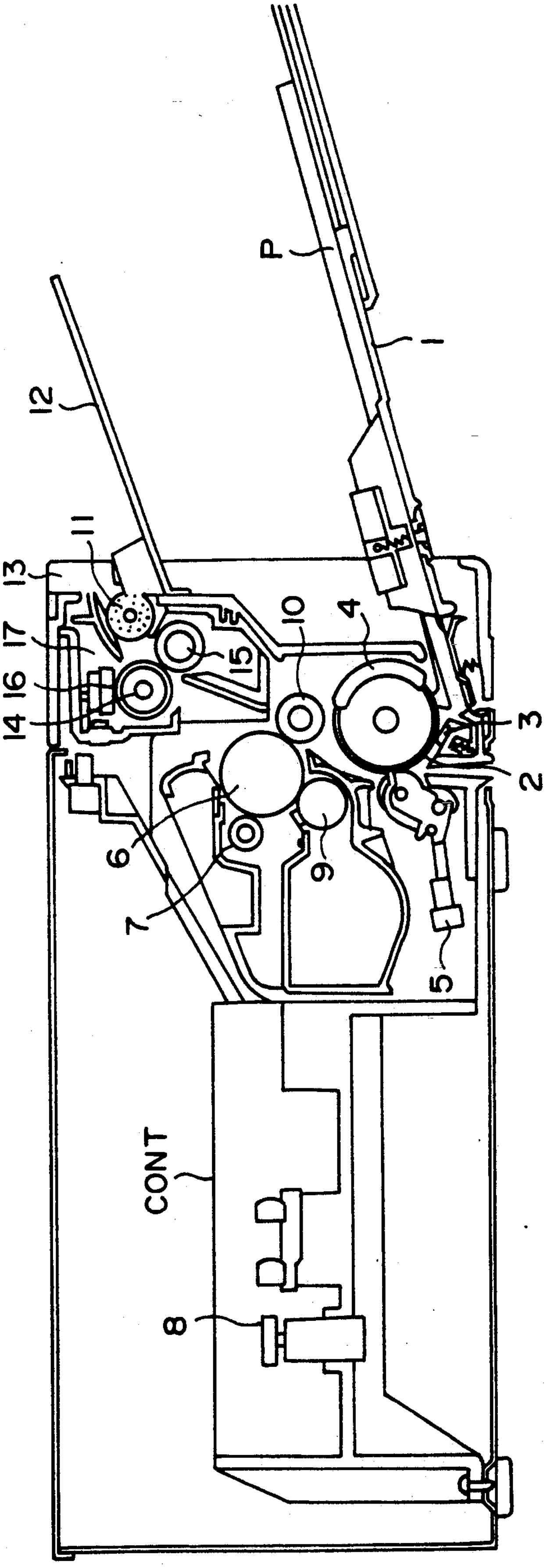
FIG. 1 is a cross sectional constructional diagram for explaining a construction of an image forming apparatus showing an embodiment of the invention.

FIG. 1 is a cross sectional constructional diagram for explaining a construction of an image forming apparatus showing an embodiment of the present invention. Reference numeral 1 denotes a paper feed tray. A set recording paper P as a recording medium is put onto the paper feed tray 1. Reference numeral 2 indicates a paper feed roller for feeding the recording papers P on the tray 1 one by one by driving a paper feed solenoid (not shown); 3 denotes a paper feed pad for pressing the recording paper P which was fed; and 4 a roller pad which is come into pressure contact with the recording paper P and presses by the rotation of the paper feed roller 2.

Reference numeral 5 denotes a paper feed sensor as paper sensing means for sensing the arrival of, e.g., a front edge of the recording paper P which was fed and for outputting a paper sensing signal PFSNS to a CPU, which will be explained hereinlater. Reference numeral 6 indicates a photo sensitive material. A laser beam which was modulated on the basis of image information is scanned onto the photo sensitive material 6 by an optical unit 8 as latent image forming means. Reference numeral 7 indicates a charging roller for uniformly charging the photo sensitive material 6.

Reference numeral 9 denotes a developing roller for developing a latent image on the photo sensitive material 6 into a toner image; 10 indicates a transfer roller for transferring the toner image developed on the photo sensitive material 6 onto the recording paper P which was fed; 11 a discharge roller for discharging the recording paper P onto a discharge tray 12; 17 a fixing unit which is constructed by a heating roller 16 that is heated by a fixing heater 14 and a pressing roller 15 and which thermally presses and fixes the toner image transferred to the recording paper P; and 13 a front door. CONT denotes a controller section comprising a video controller, which will be explained hereinlater, a CPU, a light amount adjusting circuit (APC), and the like.

Figure 2:
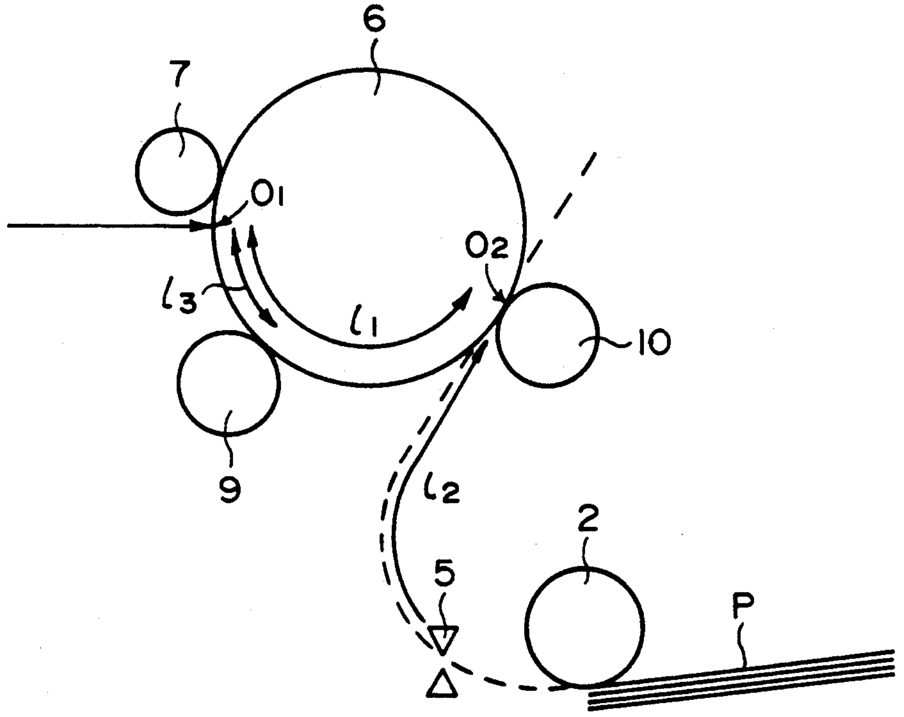
FIG. 2 is an enlarged cross sectional diagram of the main section for explaining an arrangement construction of a paper feed sensor shown in FIG. 1.

FIG. 2 is an enlarged cross sectional view of the main section for explaining an arrangement construction of the paper feed sensor 5 shown in FIG. 1. The same parts and components as those shown in FIG. 1 are designated by the same reference numerals.

In the diagram, $l_1$ denotes a moving distance of the photo sensitive material 6 from a position (latent image forming start position) $O_1$ on the photo sensitive material 6 at which a laser beam is scanned to a position $O_2$ at which a toner image is transferred onto the recording paper P by the transfer roller 10. $l_2$ denotes a conveyance distance of the recording paper P from the transfer position (position $O_2$) to the paper feed sensor 5. In the embodiment, the conveyance distance $l_2$ is equal to or longer than the moving distance $l_2$ ($l_2 \geqq l_1$) $l_3$ indicates a moving distance of the photo sensitive material 6 from the position $O_1$ on the photo sensitive material 6 at which the laser beam is scanned to a position at which the latent image is developed into the toner image by the developing roller 9.

As mentioned above, the paper feed sensor 5 detects whether the recording paper P fed from the paper feed roller 2 has reached a predetermined position or not. The sensor 5 is arranged at a predetermined upstream position away from the position $O_2$ by the moving distance $l_2$ which is equal to or longer than the moving distance $l_1$ (which satisfies the relation such that the conveyance distance $l_2 \geqq$ the moving distance $l_1$).

Figure 3:
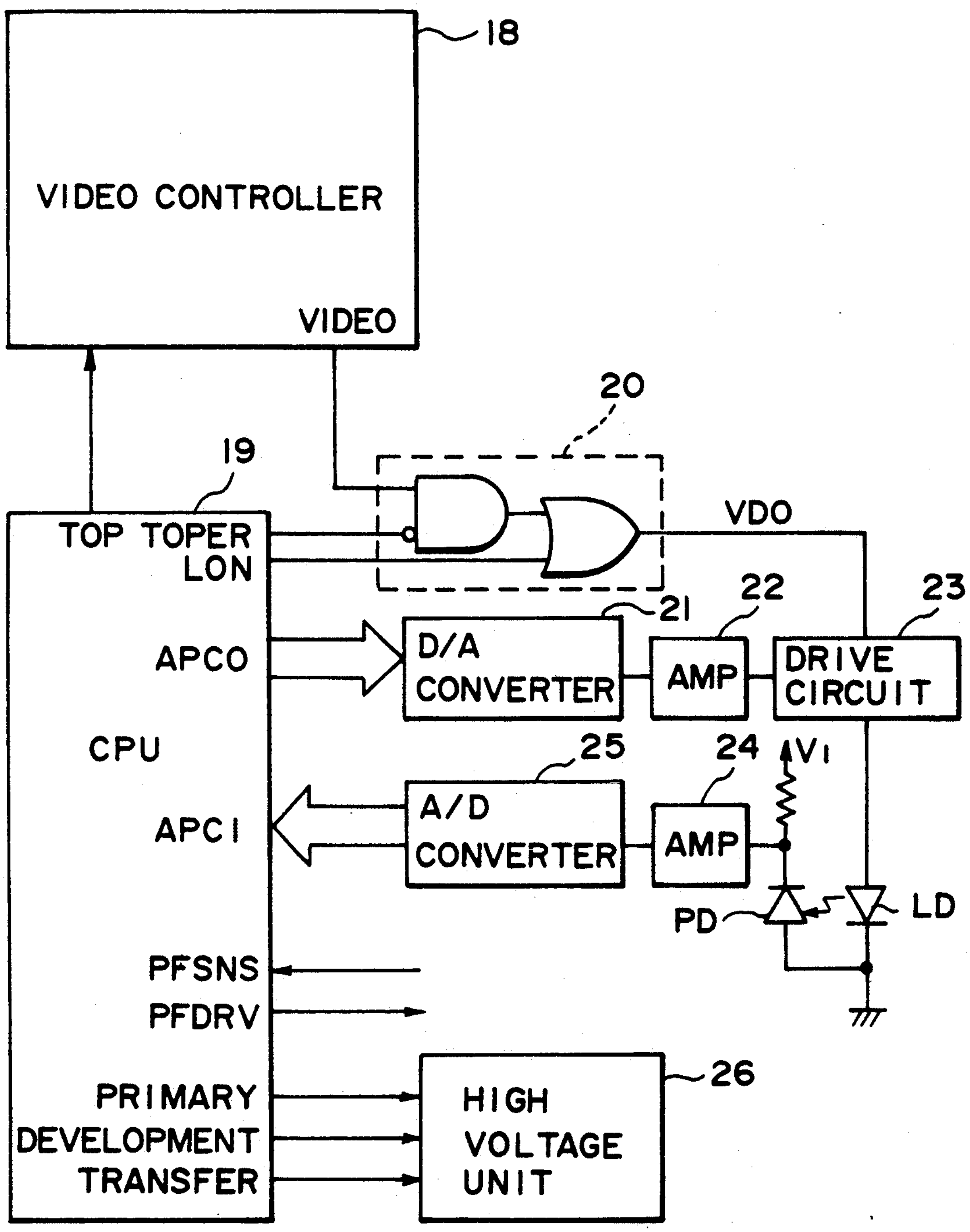
FIG. 3 is a control block diagram for explaining a construction of a controller section shown in FIG. 1.

FIG. 3 is a control block diagram for explaining a construction of the control section CONT shown in FIG. 1. Reference numeral 18 denotes a video controller having a memory to develop code data sent from a host computer or the like into pixel data (hereinafter, referred to as video data) and the like.

Reference numeral 19 indicates a CPU to integratedly control each section of the image forming apparatus on the basis of control programs stored in an ROM or the like (not shown).

Reference numeral 20 denotes a gate circuit to form an image signal VDO to control the light-on/light-off of a semiconductor laser LD on the base of a video signal VIDEO at a high (H) level or a low (L) level based on the video data from the controller 18, a laser ON signal LON (forced light-on signal) which is sent from the CPU 19, and a mask signal TOPER to mask so as not to light on a laser (semiconductor laser) LD even if the video signal VIDEO was sent in an area other than a print area. Reference numeral 21 denotes a D/A converter to D/A convert a parallel signal APCO which was set by the CPU 19 to control a light amount of the laser LD.

Reference number 22 denotes an amplifier to amplify an analog output from the D/A converter 21. Reference numeral 23 indicates a drive circuit to light on/off the laser LD on the basis of the image signal VDO from the gate circuit 20. A drive current in the light-on state of the laser LD is controlled by an output of the amplifier 22. Reference numeral 24 denotes an amplifier to amplify an output of a photo diode PD corresponding to the light amount of the laser LD; 25 indicates an A/D converter to convert a light amount output from the amplifier 24 into a parallel signal APCI; and 26 a high voltage unit to apply high voltages to the charging roller 7, developing roller 9, and transfer roller 10 in accordance with a signal from the CPU 19.

In the image forming apparatus constructed as mentioned above, when the feeding operation of the recording paper P is started by the paper feed roller 2 at a predetermined speed to the transfer roller 10 and the paper feed sensor 5 detects the arrival of the recording paper P at a predetermined position and outputs the signal PFSNS, the CPU 19 receives it and generates an image write timing signal TOP in the sub scanning direction to the photo sensitive material 6. Synchronously with the image write timing signal TOP in the subs scanning direction, the CPU 19 controls the driving of the optical unit as latent image forming means, thereby enabling an image to be recorded at a predetermined position of the recording paper P which is fed without being stopped.

Practically speaking, when the controller 18 develops the code data from the host computer to the video data and sends a print command to the CPU 19, the CPU 19 checks an internal temperature of the fixing device 17, a rotational speed of the rotary polygon mirror 8 in the optical unit, and the like. After the apparatus was set into the printable state, the CPU 19 sets a solenoid signal PFDRV to instruct the actuation of a paper feed solenoid (not shown) to the H level for, e.g., two seconds, thereby feeding the recording paper P on the paper feed tray 1. The CPU 19 also controls the high voltage unit to apply high voltages to the charging roller 7, developing roller 9, and transfer roller 10 and the light amount adjusting circuit (APC) of the semiconductor laser LD at timings, which will be explained hereinlater. When the front edge of the paper is detected by the paper sensing signal PFSNS from the paper feed sensor 5, the CPU 19 sets the image write timing signal TOP in the sub scanning direction to match the synchronization in the sub scanning direction to the controller 18 to the H level for one second after the elapse of a predetermined time $(l_2-l_1)$/recording paper conveying speed v and also sets the mask signal TOPER to the L level, thereby releasing the mask of the video signal VIDEO. The controller 18 sends the video signal VIDEO synchronously with that the image write timing signal TOP in the sub scanning direction is set to the H level. On the basis of the video signal VIDEO transmitted as mentioned above, the drive circuit 23 lights on/off the semiconductor laser LD and scans the laser beam onto the photo sensitive material 6 by the rotary polygon mirror 8, thereby forming an electrostatic latent image. The electrostatic latent image formed as mentioned above is developed to a toner image by the developing roller 9 and transferred to the recording paper P by the transfer roller 10. The transferred toner image is heated and pressed and fixed onto the recording paper P by the fixing unit 17. After that, the paper is discharged onto the discharge tray 12 by the driving of the discharge roller 11.

The operation of the high voltage unit 26 and the APC operation of the semiconductor laser LD in a normal feeding state of the recording paper P according to the image forming apparatus of the invention will now be described with reference to FIG. 4.

Figure 4:
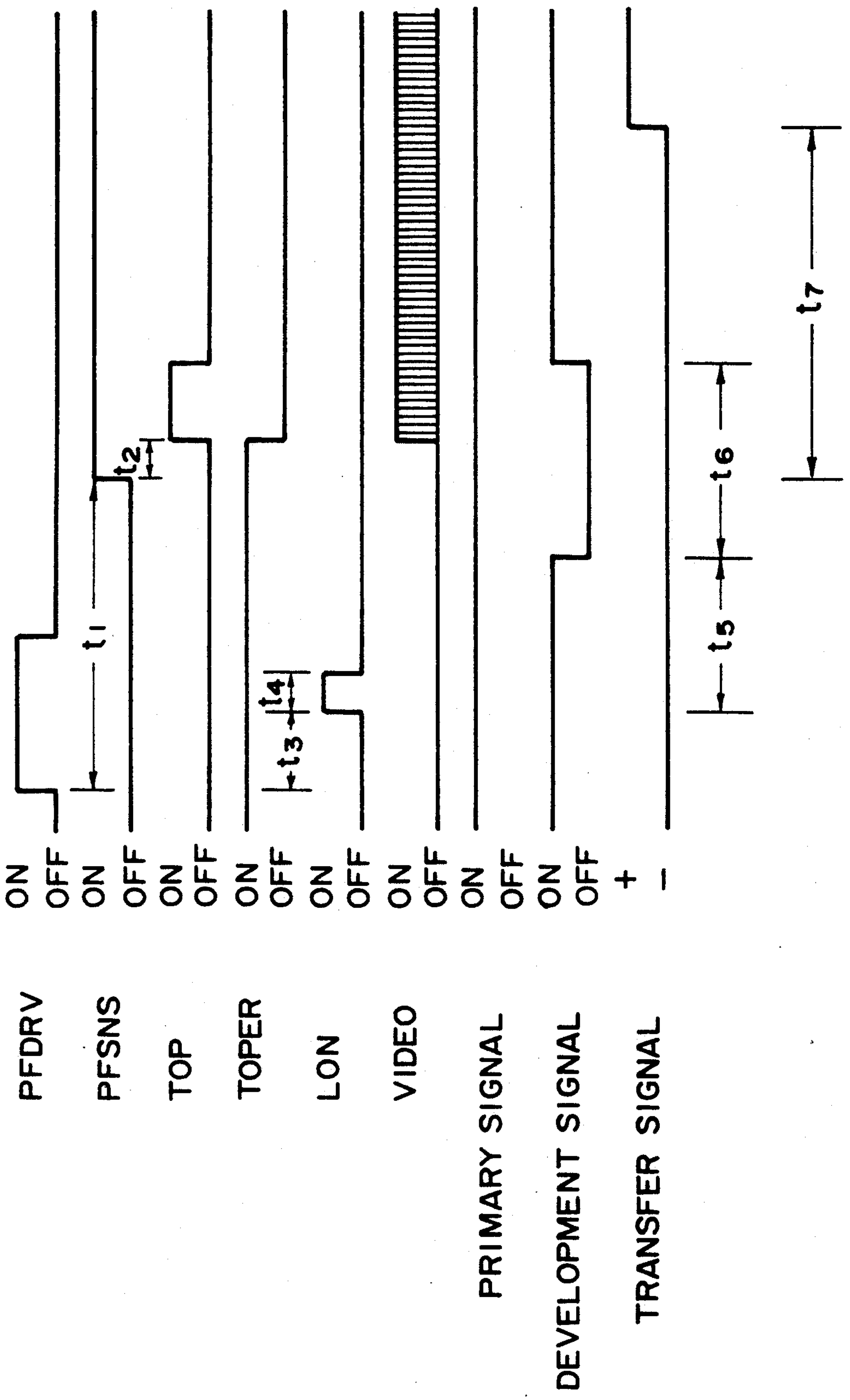
FIG. 4 is a timing chart for explaining the image sequence timing in the image forming apparatus according to the invention.

FIG. 4 is a timing chart for explaining the image sequence timing in the image forming apparatus according to the invention.

As will be understood from the diagram, the solenoid signal PFDRV is a control signal of the paper feed solenoid (not shown). When the solenoid signal PFDRV is at the H level, the paper feed solenoid is driven and the feeding operation of the recording paper P on the paper feed tray 1 is started by the paper feed roller 2. The paper sensing signal PFSNS is a signal which is input from the paper feed sensor 5 to the CPU 19. The L-level paper sensing signal PFSNS indicates the absence of the paper. The H-level signal PFSNS indicates the presence of the paper. The image write timing signal TOP in the sub scanning direction is a sync signal in the sub scanning direction and is sent from the CPU 19 to the controller 18. The H-level mask signal TOPER indicates the effective state of the mask. The L-level mask signal TOPER indicates the ineffective state of the mask. The laser ON signal LON is a forced light-on signal. The L-level laser ON signal LON indicates the laser light-off state. The H-level laser ON signal LON indicates the laser light-on state. The video signal VIDEO is an output signal from the controller 19. When the video data indicates white, the video signal VIDEO is set to the L level. When the video data indicates black, the video signal VIDEO is set to the H level and the laser light-on state is set. A primary charging system signal (primary signal) is a high voltage signal to control high voltages which are applied to the charging roller 7 and transfer roller 10. When the primary charging system (primary signal) is at the L level, the high voltages are not applied. When it is at the H level, the high voltages are applied.

A developing system signal (development signal) is a signal to control the high voltage which is applied to the developing roller 9. When the developing system (development signal) is at the L level, the high voltage is not applied. When it is at the H level, the high voltage is applied.

A transfer system signal (transfer signal) is a signal to switch the polarity of the high voltage which is applied to the transfer roller 10. When the primary signal is at the H level and the high voltage is applied to the transfer roller 10, the polarity of the high voltage is set to a plus value when the transfer system (transfer signal) is at the H level. The polarity is set to a minus value when the transfer signal is at the L level.

A time $t_1$ indicates a period of time from the start of the paper feeding operation until the front edge of the recording paper P arrives at the paper feed sensor 5. A time $t_2$ corresponds to a period of time from the timing when the front edge of the recording paper P reached the paper feed sensor 5 until the image write timing signal TOP in the sub scanning direction is sent or a period of time until the image mask is released by setting the mask signal TOPER to the L level. In the embodiment, the time $t_2$ is unconditionally defined by $(l_2-l_1)$/recording paper conveying speed v.

A time $t_3$ is a period of time from the start of the paper feeding operation until the start of the forced light-on of the semiconductor laser LD for the laser APC. A time $t_4$ corresponds to a period of time when the semiconductor laser LD is forcedly lit on for the APC of the laser LD. The CPU 19 increases or decreases a value of digital data APCO so that the digital data APCI from the photo diode PD is set to the specified value (value when the light amount of the semiconductor laser LD was equal to the specified light amount) for the period of time $t_4$, thereby controlling a current which is supplied to the laser LD.

A time $t_5$ is a period of time from the start of the laser APC until the latent image stops the supply of the high voltage to the developing roller 10 so as not to develop a belt-like electrostatic latent image which is formed on the photo sensitive material 6 by forcedly lighting on the semiconductor laser LD. In the embodiment, $t_5$ is set to $l_3/v$. A time $t_6$ corresponds to a stop period of time of the supply of the high voltage to the developing roller 10. A time $t_7$ is a period of time from the timing when the front edge of the recording paper P reached the paper feed sensor 5 until the polarity of the high voltage which is applied to the transfer roller 10 is switched from the minus value to the plus value until the recording paper P reaches the transfer roller 10. When the recording paper P is set to the transfer roller 10, since the toner image is transferred to the recording paper P, the high voltage is set to the plus polarity. When the recording paper P is not set to the transfer roller 10, the high voltage is set to the minus polarity to return the dirt of the toner remaining on the transfer roller 10 to the photo sensitive material 6 and to clean the dirt of the transfer roller 10.

The operation of the high voltage unit 26 and the APC operation of the semiconductor laser LD in the abnormal feeding state of the recording paper P in the image forming apparatus according to the invention will now be described with reference to FIG. 5.

Figure 5:
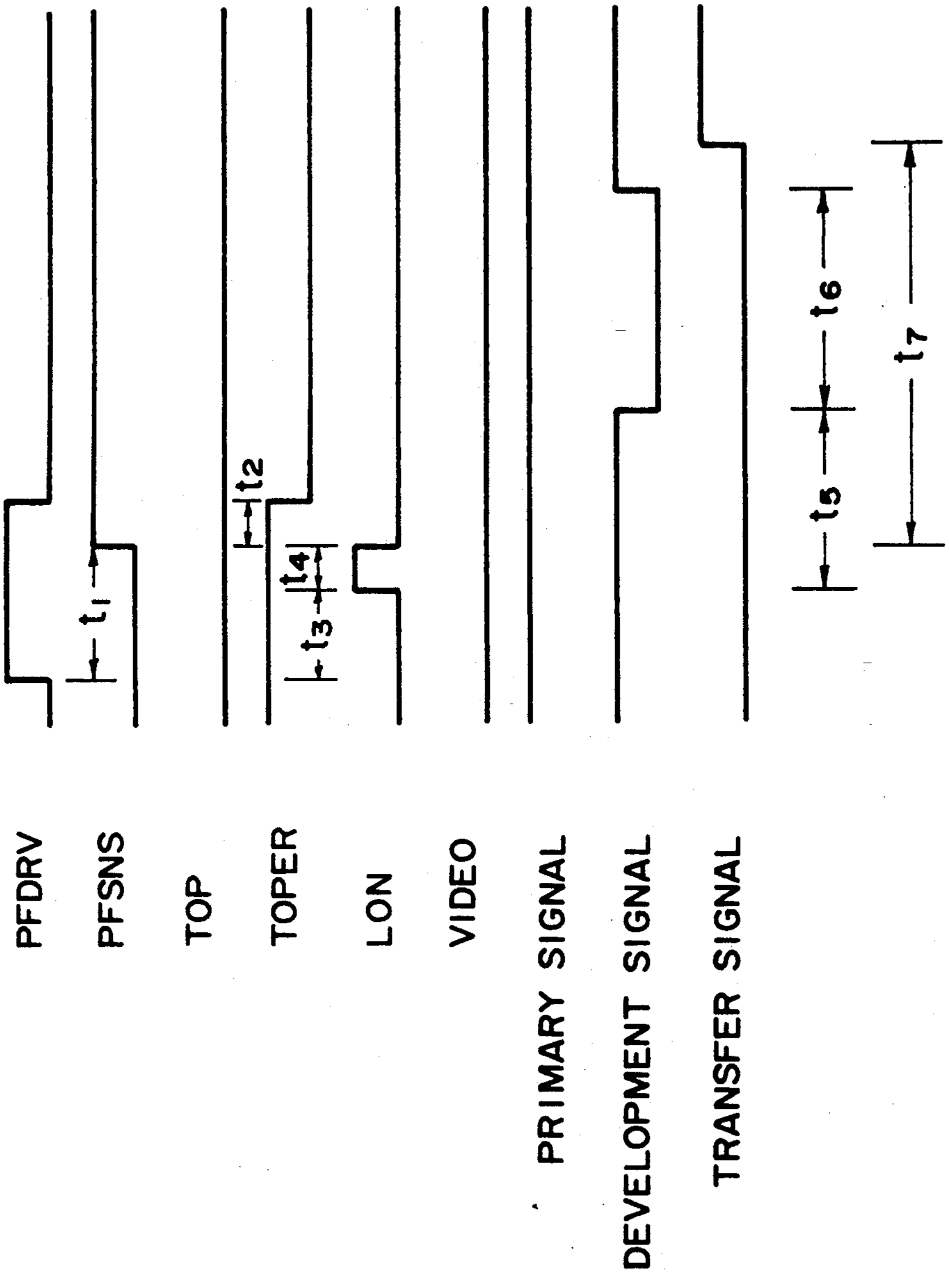
FIG. 5 is a timing chart for explaining the image sequence timing in an abnormal paper feeding state in the image forming apparatus according to the invention.

FIG. 5 is a timing chart for explaining the image sequence timing in the abnormal paper feeding state in the image forming apparatus according to the invention. The same components as those shown in FIG. 4 are designated by the same reference numerals.

As will be understood from the diagram, in the case where the recording paper P has reached the paper feed sensor 5 after the elapse of time $t_1'(<t_3+t_4)$ after the start of the feeding operation of the recording paper P by setting the solenoid signal PFDRV to the H level, namely, within a period of time $(t_3+t_4)$ when the semiconductor laser LD is forcedly lit on for the laser APC, that is, in the case where it is determined that even if the controller 18 sent the video signal VIDEO synchronously with the front edge of the paper, the laser APC overlaps and the normal printing cannot be executed, the CPU 19 informs the occurrence of a defective paper feed and conveyance to the controller 18 via a communication line (not shown). Further, the CPU 19 stops the transmission of the image write timing signal TOP in the sub scanning direction as a sync signal in the sub scanning direction. Thus, the controller 18 stops the transmission of the video signal VIDEO.

As mentioned above, in the case where the recording paper P on the paper feed tray 1 was put in a state in which it is projected to the front side than a predetermined position, the front edges of the fed recording paper P and the image cannot be matched. Therefore, a check is made to see if the fed recording paper P can be printed or not within a period of time from the start of the feeding operation of the recording paper P until the recording paper P reaches the paper feed sensor 5. If the recording paper P cannot be printed, an error is indicated to the controller 18, thereby stopping the transmission of the image write timing signal TOP in the sub scanning direction as a sync signal in the sub scanning direction.

Therefore, the synchronization matching in the sub scanning direction with the latent image forming means for forming a latent image or the like can be executed by the arrival presence/absence sensing state of the recording paper P of the sensor mechanism which is extremely simpler than the sub scanning direction processing by the conventional resist roller mechanism.

Figure 6:
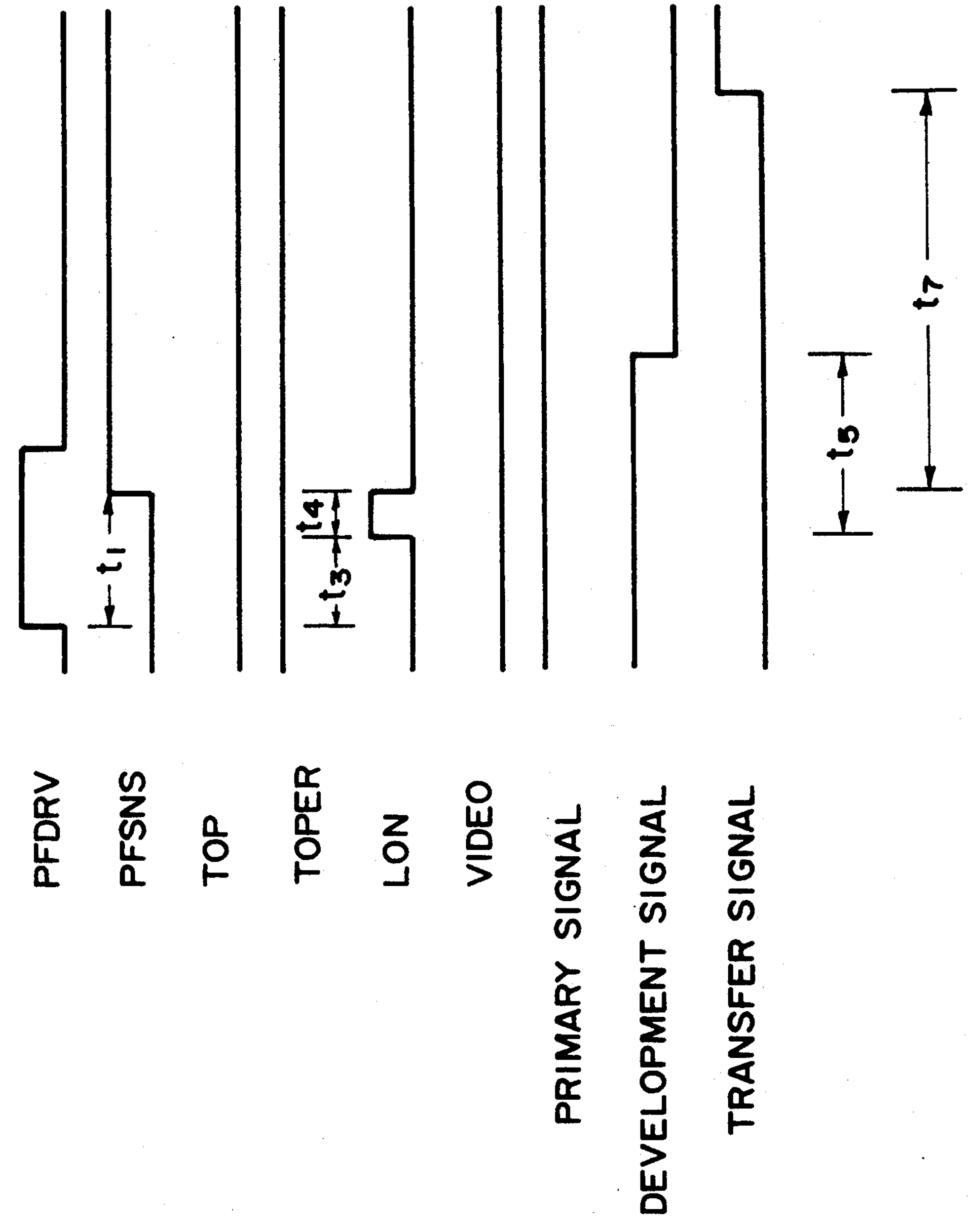
FIG. 6 is a timing chart for explaining the image sequence timing in another abnormal paper feeding state in the image forming apparatus according to the invention.

FIG. 6 is a timing chart for explaining the image sequence timing in another abnormal paper feeding state in the image forming apparatus according to the invention.

Explanation will now be practically made hereinbelow with reference to the timing chart shown in FIG. 6.

As will be understood from the diagram, in the case where the recording paper P has reached the paper feed sensor 5 after the elapse of time $t_1'(<t_3+t_4)$ from the start of the feeding operation of the recording paper P by setting the solenoid signal PFDRV to the H level, that is, within a period of time $(t_3+t_4)$ when the semiconductor laser LD is forcedly lit on for the laser APC, the CPU 19 informs the occurrence of a defective paper feed and conveyance to the controller 18 and stops the transmission of the image write timing signal TOP in the sub scanning direction. Further, synchronously with the front edge of the recording paper P, the mask signal TOPER is maintained in the H level state and masking state of the video signal VIDEO is held by the gate circuit 20. On the other hand, even after completion of the laser APC, the development signal is held in the L level state and the high voltage is not applied to the developing roller 9, thereby preventing that the toner image is developed on the photo sensitive material 6.

As mentioned above, after the CPU 19 detected the defective paper feed and conveyance by monitoring the conveying state of the recording paper P, the masking state of the video signal VIDEO is maintained and the supply of the high voltage to the developing roller 9 is stopped. Therefore, even if there occurs a situation such that the controller 18 erroneously transmitted the video signal VIDEO after the defective paper feed and conveyance had been detected, it is possible to prevent that an electrostatic latent image is formed on the photo sensitive material 6. A dirt around the photo sensitive material 6 can be preliminarily avoided and an unnecessary toner consumption can be suppressed.

The embodiment has been described with respect to the case where when the recording paper P has reached the paper feed sensor 5 within a period of time ($t_3+t_4$) from the start of the feeding operation of the recording paper P by setting the solenoid signal PFDRV to the H level until the forced light-on of the semiconductor laser LD for the laser APC, the CPU 19 informs the defective paper feed and conveyance to the controller 18 and stops the transmission of the image write timing signal TOP in the sub scanning direction. However, if the driving of the paper feed roller 2 is stopped by the detection of the defective paper feed and conveyance, the fed recording paper P remains in the apparatus. Therefore, to avoid such a paper jam, the following control is executed.

That is, after the recording paper P was fed by the paper feed roller 2 by the CPU 19, while the latent image forming means, developing roller 9, and transfer roller 10 are executing the initialization at predetermined timings, the CPU 19 stops the execution of the image forming processing by monitoring a transmitting state of the image write timing signal TOP in the sub scanning direction from the sync signal generating means. After the execution of the image forming processing was stopped, the discharging means (in the embodiment, the conveying driving system of the recording paper P) automatically discharges the recording paper P which was fed to the paper feed roller 2, thereby avoiding the occurrence of the jam of the recording medium.

Practically speaking, in the case where the defective paper feed and conveyance as mentioned above occurred, the CPU 19 also continuously drives the conveying system of the recording paper P without stopping it even after the CPU 19 informed the occurrence of the defective paper feed and conveyance to the controller 18. The CPU 19 checks a predetermined jam detecting sequence, for instance, a period of time from the time point when the front edge of the paper was detected by the paper feed sensor 5 until the rear edge of the paper passes . through the sensor 5. If the recording paper P was discharged onto the discharge tray 12 without causing any paper jam, the end of the paper conveyance is informed to the controller 18.

After the completion of the paper conveyance was informed from the CPU 19 to the controller 18, the controller 18 requests the CPU 19 to eliminate the erroneous state due to the defective paper feed and conveyance. Thereafter, by again outputting a start command of the printing operation to the CPU 19, the printing operation is restarted.

As mentioned above, when the defective paper feed and conveyance occurred, by automatically discharging the recording paper P, the apparatus can be set into the next image forming processing state without executing the jam eliminating processing by the operation by the operator.

Figure 7:
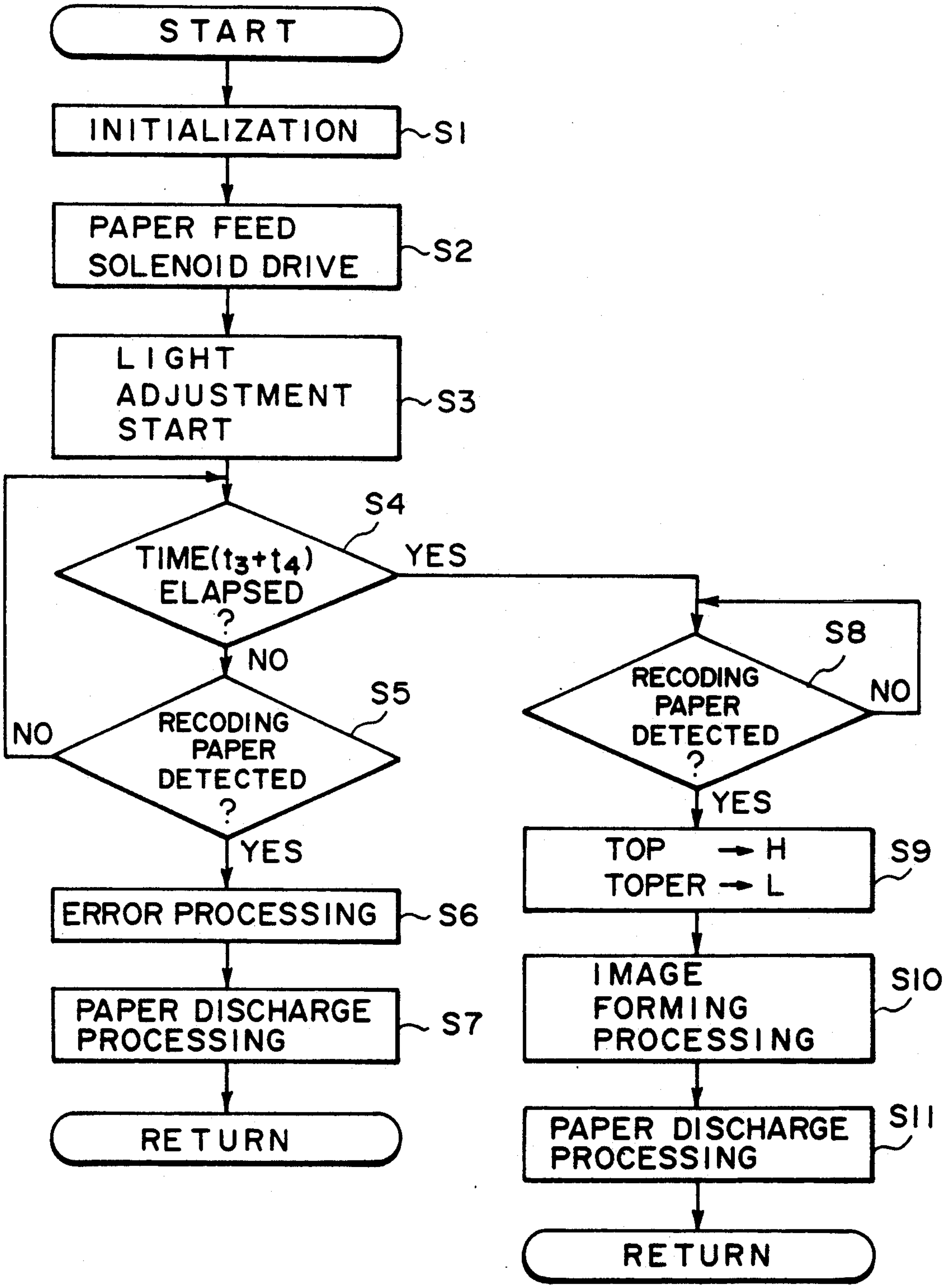
FIG. 7 is a flowchart for explaining an example of the image forming sequence in the image forming apparatus according to the invention.

FIG. 7 is a flowchart for explaining an example of the image forming sequence in the image forming apparatus according to the invention. Reference numerals (1) to (11) show processing steps.

First, each section is initialized (1). The solenoid signal PFDRV is set to the H level and the paper feed solenoid is driven (2). The feeding operation of the recording paper P is started.

Then, the light adjustment (APC) is started (3). A check is made to see if the time ($t_3+t_4$) has elapsed or not (4). If NO, a check is made to see if the paper feed sensor 5 has detected the recording paper P or not (5). If YES, that is, if the image matching in the sub scanning direction is impossible, the foregoing error processing is executed (6). A discharge processing of the fed recording paper P is executed (7) and the processing routine is returned.

On the other hand, if YES in step (4), a check is made to see if the paper feed sensor 5 has detected the recording paper P or not (8). If the sensor 5 has detected the paper, the image write timing signal TOP in the sub scanning direction is set to the H level and the mask signal TOPER is set to the L level (9). The image forming processing is started (10).

Then, the discharge processing to discharge the recording paper P on which the electrostatic latent image formed on the photo sensitive material 6 had been developed and the image was transferred and fixed is executed (11) and the processing routine is returned.

As described above, according to the invention, there are provided: feeding means for feeding a recording medium to a transfer position at a predetermined speed; paper sensing means for sensing whether the recording medium fed from the feeding means has reached a predetermined upstream position or not than a transfer position which can satisfy the relation such that a moving distance of the recording medium is equal to or longer than a moving distance from a latent image forming position on the photo sensitive material to the transfer position; sync signal generating means for generating an image write timing signal in the sub scanning direction to the photo sensitive material on the basis of the arrival state of the recording medium at the predetermined position which was detected by the paper sensing means; and control means for controlling the driving of the latent image forming means on the basis of the image write timing signal in the sub scanning direction which is output from the sync signal generating means. Therefore, different from the conventional complicated synchronization matching mechanism in the sub scanning direction, the synchronizing processing in the sub scanning direction can be performed from the feeding state of the fed recording medium. The synchronization matching in the sub scanning direction can be determined by the detection of the passing state of the predetermined position of the recording medium which is conveyed without stopping the synchronization matching in the sub scanning direction. Thus, the remarkable improvement of the throughput can be expected as compared with the conventional one.

On the other hand, there are provided: initializing means for initializing the latent image forming means, developing means, and transfer means at predetermined timings after the recording medium was fed by the feeding means; stopping means for stopping the execution of the image forming processing while checking the transmitting state of the image write timing signal in the sub scanning direction from the sync signal generating means during the initializing processing by the initializing means; and discharging means for automatically discharging the recording medium fed to the feeding means after the execution of the image forming processing was stopped by the stopping means. Therefore, even if a defective paper feeding state of the fed recording medium occurred, the fed recording medium can be automatically discharged for preparation of the next image formation. Therefore, there are obtained excellent advantages such that the jam eliminating processing due to the deviation of the synchronizing timings is reduced, the image forming processing to the recording medium which is fed next can be efficiently restarted, and the like.

The present invention is not limited to the foregoing embodiments but many modifications and variations are possible within the spirit and scope of the appended claims of the invention.

We claim:

1. A recording apparatus comprising:

a recording unit which is structured for recording image information onto a recording medium;

a feeder which is structured for feeding the recording medium to the recording unit;

a detector which is provided between the recording unit and the feeder and is structured for detecting the recording medium being fed;

a controller which is structured for inhibiting the recording operation of the recording unit in the case where the detector detects the recording medium before the elapse of a predetermined period of time from the start of the feeding operation of the feeder; and an image information generator which is structured for generating the image information, wherein in the case where the recording medium is detected by the detector before the elapse of the predetermined period of time from the start of the feeding operation of the feeder, the controller informs said image information generator that the recording operation is impossible.

2. An apparatus according to claim 1, wherein when the fed recording medium was detected by the detector before the elapse of the predetermined period of time from the start of the feeding operation of the feeder, the controller transmits an inhibition signal to inhibit the recording operation irrespective of the presence or absence of the transmission of the image information to the recording unit.

3. A recording apparatus comprising:

a recording unit which is structured for recording image information onto a recording medium;

a feeder which is structured for feeding the recording medium to the recording unit;

a detector which is provided between the recording unit and the feeder and is structured for detecting the recording medium being fed;

a controller which is structured for inhibiting the recording operation of the recording unit in the case where the detector detects the recording medium before the elapse of a predetermined period of time from the start of the feeding operation of the feeder; and an image information generator which is structured for generating the image information, wherein in the case where the recording medium is detected by the detector after the elapse of the predetermined period of time from the start of the feeding operation of the feeder, the controller outputs a sync signal to the image information generator, and the image information generator transmits image information to the recording unit synchronously with the sync signal, and wherein in the case where the recording medium is detected by the detector before the elapse of the predetermined period of time from the start of the feeding operation of the feeder, the controller does not output the sync signal.

4. A recording apparatus comprising:

a recording unit which is structured for recording image information onto a recording medium;

a feeder which is structured for feeding the recording medium to the recording unit;

a detector which is provided between the recording unit and the feeder and is structured for detecting the recording medium being fed;

a controller which is structured for inhibiting the recording operation of the recording unit in the case where the detector detects the recording medium before the elapse of a predetermined period of time from the start of the feeding operation of the feeder; and a discharger for discharging the recording medium on which the image information was recorded by the recording unit, wherein in the case where the recording medium is detected by the detector before the elapse of the predetermined period of time from the start of the feeding operation of the feeder, the controller allows the discharger to discharge the recording medium without recording the image information onto the recording medium which was fed by the feeder.

5. An apparatus according to claim 4, wherein when the recording medium was discharged by the discharger without recording the image information onto the recording medium which had been fed by the feeder, the controller instructs to feed a new recording medium in order to record the information which could not be recorded.

6. A recording apparatus comprising:

a recording unit which is structured for recording image information onto a recording medium, said recording unit including a photosensitive material which is rotated at a predetermined rotational speed, a beam generator for generating a beam which was modulated on the basis of the image information in order to form an electrostatic latent image onto the photosensitive material, a developing unit for developing the electrostatic latent image formed on the photosensitive material and forming a toner image, and a transfer unit for transferring the toner image formed on the photosensitive material onto the recording medium;

a feeder which is structured for feeding the recording medium to the recording unit;

a detector which is provided between the recording unit and the feeder and is structured for detecting the recording medium being fed; and a controller which is structured for inhibiting the recording operation of the recording unit in the case where the detector detects the recording medium before the elapse of a predetermined period of time from the start of the feeding operation of the feeder.

7. An apparatus according to claim 6, wherein the detector is arranged at a position such as to satisfy a relation of $l_2 > l_1$ between a moving distance $l_1$ on the surface of the photo sensitive material from an exposing position on the photo sensitive material by the beam until a position where the toner image is transferred by the transfer unit and a moving distance $l_2$ of the recording medium from the detector until the position where the toner image is transferred by the transfer unit.

8. An apparatus according to claim 6, further comprising a beam detector for detecting a light amount of the beam generated from the beam generator, and wherein the controller controls the light amount of the beam generator on the basis of a detection signal of the beam detector.

9. An apparatus according to claim 6, wherein when the recording medium was detected before the elapse of the predetermined period of time from the start of the feeding operation of the feeder, the controller does not start the actuation of the developing unit.

10. An apparatus according to claim 6, wherein said apparatus has neither a resist roller nor a resist shutter.

11. A recording apparatus comprising:

a recording unit which is structured for recording image information onto a recording medium;

a feeder which is structured for feeding the recording medium to the recording unit;

a detector which is provided between the recording unit and the feeder and is structured for detecting the recording medium being fed; and a controller which is structured for inhibiting the recording operation of the recording unit in the case where the detector detects the recording medium before the elapse of a predetermined period of time from the start of the feeding operation of the feeder, wherein the recording unit includes:

a photosensitive material which is rotated at a predetermined rotational speed;

an exposure unit for exposing the photosensitive material so as to form an electrostatic latent image thereon;

a developing unit for developing the electrostatic latent image formed on the photosensitive material and forming a toner image; and a transfer unit for transferring the toner image formed on the photosensitive material onto the recording medium which is fed by the feeder, wherein the detector is arranged at a position such as to satisfy a relation of $l_2 \geqq l_1$ between a moving distance $l_1$ on the surface of the photosensitive material from an exposing position on the photosensitive material by the beam until a position where the toner image is transferred by the transfer unit and a moving distance $l_2$ of the recording medium from the detector until the position where the toner image is transferred by the transfer unit, and wherein said exposure unit in response to the detection ouptut from the detector commences the exposing operation.

12. A recording apparatus according to claim 11 further comprising a discharger for discharging the recording medium on which the information was recorded by the recording unit, wherein in the case where the recording medium is detected by the detector before the elapse of the predetermined period of time from the start of the feeding operation of the feeder, the controller allows the discharger to discharge the recording medium without recording the recording information onto the recording medium which was fed by the feeder.

13. A recording apparatus according to claim 12, wherein in the case where the recording medium is discharged by the discharger without recording the recording information onto the recording medium which had been fed by the feeder, the controller instructs to feed a new recording medium in order to record the recording information which could not be recorded.

14. A recording apparatus according to claim 11, wherein in the case where the recording medium is detected before the elapse of the predetermined period of time from the start of the feeding operation of the feeder, the controller does not start the actuation of the developing unit.

15. A recording apparatus according to claim 11, wherein said apparatus has neither a resist roller nor a resist shutter.

* * * * *

UNITED STATES PATENT AND TRADEMARK OFFICE

CERTIFICATE OF CORRECTION

PATENT NO. : 5,134,427

DATED : July 28, 1992

INVENTOR(S) : Satoshi Akiyama, et al.

It is certified that error appears in the above-identified patent and that said Letters Patent is hereby corrected as shown below:

COVER PAGE

Under [56] References Cited, under "U.S. Patent Documents", please insert after
"4,417,806 11/1983 Tani et al. 355/317"

--4,613,227 9/1986 Honjo 355/14--; and please also insert the following:

--FOREIGN PATENT DOCUMENTS

| | | |
|---|---|---|
| 56-137365 | 10/27/81 | Japan |
| 58-145481 | 8/30/83 | Japan |
| 59-228265 | 12/21/84 | Japan |
| 61-173261 | 8/3/86 | Japan |

OTHER PUBLICATIONS

Cochran, et al. "Servo-Controlled Paper Gate", IBM Technical Disclosure Bulletin, Vol. 22, No. 12, May 1980, New York, Pages 5268-5269--.

IN THE DRAWINGS:

Sheet 7, Figure 7, "RECODING" should read --RECORDING-- (both occurrences).

UNITED STATES PATENT AND TRADEMARK OFFICE
CERTIFICATE OF CORRECTION

PATENT NO. : 5,134,427

DATED : July 28, 1992

INVENTOR(S) : Satoshi Akiyama, et al.

It is certified that error appears in the above-identified patent and that said Letters Patent is hereby corrected as shown below:

COLUMN 1

Line 2, "APPARATUSBACKGROUND" should read --APPARATUS--;

Line 3, "OF THE INVENTION" should be deleted; and

Line 4, insert the heading --BACKGROUND OF THE INVENTION--.

COLUMN 3

Line 7, "distance $l_2(l_2 \geq l_1) l_3$" should read --distance $l_2(l_2 \geq l_1) \cdot l_3$--;

Line 33, "base" should read --basis--; and

Line 44, "number 22" should read --numeral 22--.

COLUMN 4

Line 30, "that" should be deleted.

UNITED STATES PATENT AND TRADEMARK OFFICE

CERTIFICATE OF CORRECTION

PATENT NO. : 5,134,427

DATED : July 28, 1992

INVENTOR(S) : Satoshi Akiyama, et al.

It is certified that error appears in the above-identified patent and that said Letters Patent is hereby corrected as shown below:

COLUMN 6

Line 6, "of" should read --off--;

Line 37, "than" should read --rather than--; and

Line 53, "extremely" should read --much--.

COLUMN 8

Line 50, "than" should be deleted.

Signed and Sealed this

Fourteenth Day of December, 1993

Attest:

BRUCE LEHMAN

Attesting Officer

Commissioner of Patents and Trademarks